United States Patent
Aher et al.

(10) Patent No.: US 12,229,201 B2
(45) Date of Patent: Feb. 18, 2025

(54) SYSTEMS AND METHODS FOR SUBJECTIVELY MODIFYING SOCIAL MEDIA POSTS

(71) Applicant: Adeia Guides Inc., San Jose, CA (US)

(72) Inventors: Ankur Anil Aher, Maharashtra (IN); Susanto Sen, Karnataka (IN)

(73) Assignee: ADEIA GUIDES INC., San Jose, CA (US)

( * ) Notice: Subject to any disclaimer, the term of this patent is extended or adjusted under 35 U.S.C. 154(b) by 0 days.

(21) Appl. No.: 16/887,205

(22) Filed: May 29, 2020

(65) Prior Publication Data

US 2021/0374193 A1    Dec. 2, 2021

(51) Int. Cl.
| | |
|---|---|
| G06F 16/951 | (2019.01) |
| G06F 16/908 | (2019.01) |
| G06F 16/909 | (2019.01) |
| G06F 16/9535 | (2019.01) |
| G06F 16/9536 | (2019.01) |

(52) U.S. Cl.
CPC ......... *G06F 16/951* (2019.01); *G06F 16/908* (2019.01); *G06F 16/909* (2019.01); *G06F 16/9535* (2019.01); *G06F 16/9536* (2019.01)

(58) Field of Classification Search
None
See application file for complete search history.

(56) References Cited

U.S. PATENT DOCUMENTS

| | | | |
|---|---|---|---|
| 10,592,513 B1 * | 3/2020 | Cionca | H04W 4/21 |
| 10,693,956 B1 * | 6/2020 | Green | H04L 63/0428 |
| 11,048,387 B1 | 6/2021 | Srinivasan et al. | |
| 11,182,448 B1 | 11/2021 | Simpson et al. | |
| 2004/0003352 A1 * | 1/2004 | Bargeron | G06F 16/9535 715/255 |
| 2012/0102420 A1 | 4/2012 | Fukahori | |
| 2014/0032718 A1 * | 1/2014 | Berger | H04L 67/06 709/219 |
| 2014/0357312 A1 * | 12/2014 | Davis | G06T 1/0064 455/550.1 |
| 2016/0019464 A1 * | 1/2016 | Madhavan | H04W 4/18 706/11 |
| 2016/0086205 A1 * | 3/2016 | Dove | H04W 4/02 705/7.32 |

(Continued)

OTHER PUBLICATIONS

U.S. Appl. No. 16/887,207, filed May 29, 2020, Ankur Anil Aher.

*Primary Examiner* — Kris E Mackes
*Assistant Examiner* — Soheila (Gina) Davanlou
(74) *Attorney, Agent, or Firm* — HALEY GUILIANO LLP

(57) ABSTRACT

Systems and methods are described herein for subjectively modifying social media posts. The system receiving a version of a social media post from a sender, along with a list of target users, and generates one or more modified versions of the social media post based on the preferences of the target user. The system retrieves a plurality of the versions of the post and selects a version based on quality and other attributes. The selected version of the post is modified based on the target user's preferences. The system modifies, for example, text, images, or video of the post to generate one or more modified versions of the social media post. In other embodiments, the system may determine the number of modifications made to a post being shared, and compare the number of modifications against a modifying threshold.

19 Claims, 8 Drawing Sheets

(56) References Cited

U.S. PATENT DOCUMENTS

| | | |
|---|---|---|
| 2017/0063551 A1 | 3/2017 | Quinn et al. |
| 2017/0140118 A1 | 5/2017 | Haddad et al. |
| 2018/0048614 A1 | 2/2018 | Greenberger et al. |
| 2018/0316776 A1 | 11/2018 | Lu |
| 2019/0080349 A1* | 3/2019 | Berzin ................. G06F 16/955 |
| 2019/0108353 A1 | 4/2019 | Sadeh et al. |
| 2019/0120871 A1 | 4/2019 | Ericson |
| 2019/0132274 A1* | 5/2019 | Seshiah ................ G06Q 10/107 |
| 2020/0034887 A1* | 1/2020 | Hamedi ............. G06Q 30/0204 |
| 2020/0252478 A1* | 8/2020 | Dukellis ............... G06F 16/958 |
| 2021/0097240 A1 | 4/2021 | Singh |
| 2021/0374194 A1 | 12/2021 | Aher et al. |

\* cited by examiner

SYSTEMS AND METHODS FOR SUBJECTIVELY MODIFYING SOCIAL MEDIA POSTS

BACKGROUND

The present disclosure relates to methods and devices for generating personalized social media posts, and, more particularly, devices that search for versions of the post and modify the post based on a target user or user group.

SUMMARY

Social media sharing from a sender to a target user or group of users is a trend in current times. While trying to share a post on a social media platform (e.g., a post, a Facebook Story®, an Instagram Story®, TikTok®) with target users or user groups on social media, the post is typically generic and in many cases not the best version of the post. For example, a shared post (e.g., still images, news articles, social media stories, graphics interchange format (GIF) or similar format images, videos, etc.) on a social media platform is generally forwarded to a target user or user group without any additional captions or explanations or personalization specific to each user or user group. In another example, the post is not even the best version of the post, but rather just a version (e.g., low-quality image) of the post forwarded by the user. Some senders, for example, social media influencers, may wish to attract more attention to their posts to increase consumption of the post and/or have their posts "liked" by more users or user groups to thereby further increase their audience. However, many users or user groups have individual preferences for social media posts and do not consume or respond to generic posts. Accordingly, senders may wish to forward a version of their social media post that has been personalized based on the preferences of each user or user group.

In another scenario, while some social media posts are forwarded, a sender may forward a social media post without being aware of the appropriateness of the post to each target user or user group. The post may not be appropriate for consumption by each user or group of users, because the post may be modified beyond recognition and lose its original appeal. Further, a post may be modified beyond a user's or group' of user's preferences and lead the user or group of users to avoid the post. For example, a user or user group may have preferences to avoid certain topics, profanity, inappropriate posts or excessive modifications to a post. The conventional method, the sender, may not consider the preferences of the user or user group and forward the post in front of the user or user group, and in response, the user or user group may scroll or swipe past the post posts that attract their attention. Thus, the posts are often ignored by the user or user group or given less than a second of time in front of the users to attract the users' attention before being skipped.

To overcome these problems, methods and systems are disclosed for subjectively modifying a social media post. In particular, the embodiments described herein provide for receiving a first version of a social media post and retrieving, based on the first version of the social media post, a plurality of versions of the social media content (e.g., a video, image, story). In order to provide the highest-quality version of the post, the methods and systems then identify a second version of the social media post from the plurality of versions of the social media post based on the quality of the version, and retrieve preferred criteria for each target user or target user group. A method and a system then modifies the second version of the post based on the preferred criteria of each user or group, generating one or more social media posts associated with each user or user group, and transmit the social media post to the respective user or user group.

In some embodiments, the system extracts one or more identifiers from the social media post. For example, a location identifier, an image identifier, a text identifier, and/or a video identifier. Further, using the identifiers, the methods and systems identify a plurality of version of the media content based on matching identifiers and store them in a database.

In accordance with another approach, methods and systems are disclosed for subjectively evaluating a social media post to determine a number of modifications. For example, a post to be shared with a target user may be modified to include a salutation, additional objects, emoticons, or an image-coloring filter. This type of over-modification typically lacks authenticity. Specifically, the user prefers to see rawer posts, with fever modifications. In some embodiments, the systems and methods described herein provide for receiving a social media post and a listing of a target user or target user groups. In some embodiments, various methods further retrieve from a database of social media posts many versions of the same social media post and select one version. The selected version is modified based on target user preferences. In other embodiments, various systems modify the received social media post to include salutations, language, objects (e.g., images, text, video, audio), style, or any other attributes that help personalize the social media post for each target user or target user group. The modified version is then compared against the original post to determine a number of modifications and whether the number of modifications exceeds the user's modification threshold. When the number of modifications for each modified social media content post is below the modification threshold, various methods and systems transmit for presentation to each target user or group the associated modified social media post.

In some embodiments, when the number of modifications for each modified social media content post exceeds the modification threshold, the methods and systems revise the one or more modified versions to remove modifications from the one or more modified versions to generate new, semi-modified versions of the social media post.

The methods and systems described herein provide an improved process for identifying a second version of the social media post and generating a personalized version of the social media post by enhancing for each user or user group. The systems and methods receive a social media post and retrieve a second version of the social media post for modifying the second version based on preferences associated with a user or user group. To that end, the methods and systems receive a social media post to present to target users or target user groups, identifying a second version of the social media post and modifying the second version of the social media post to customize the social media post based on the user or user group's preferences.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
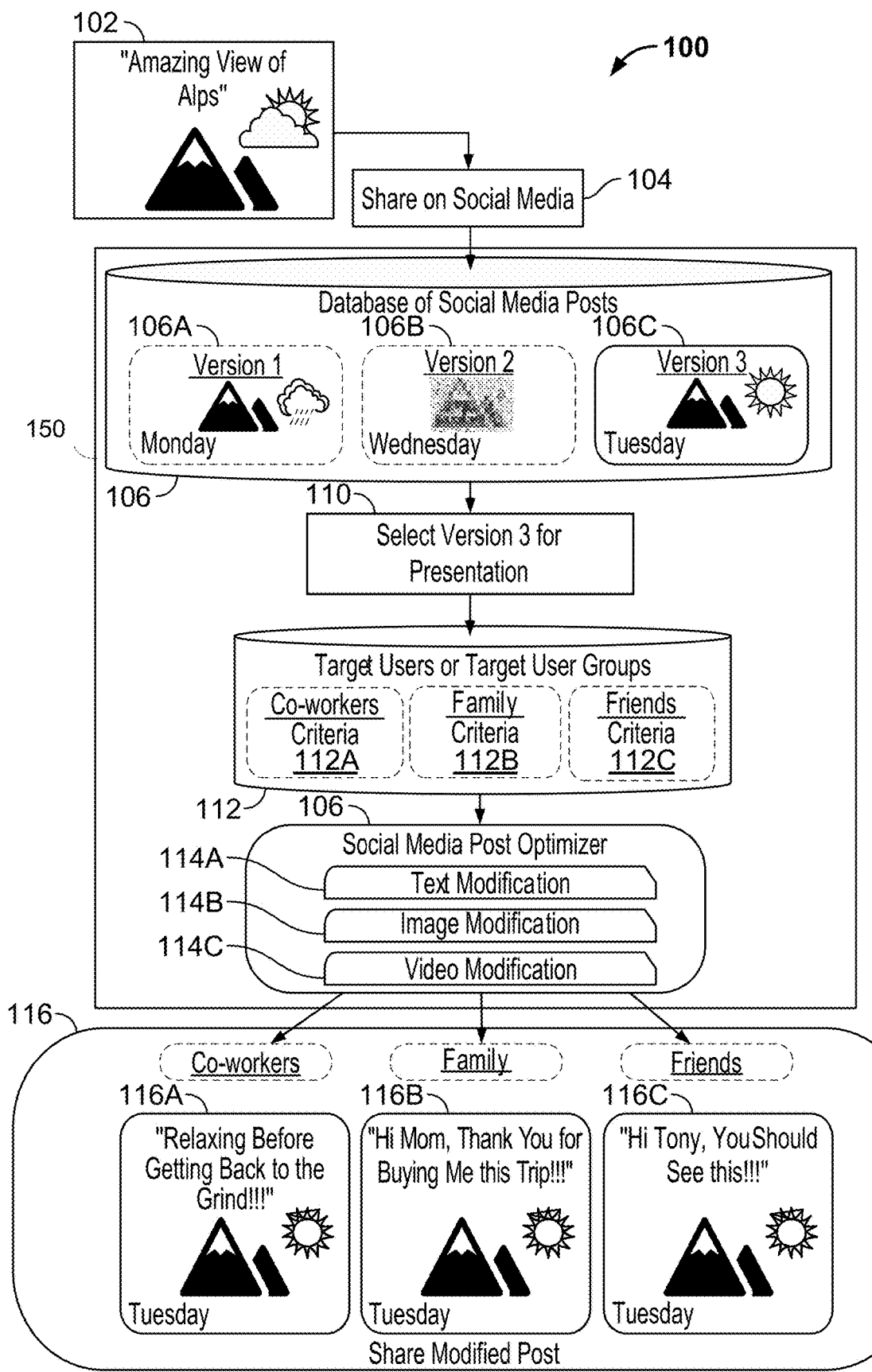
FIG. 1 is a block diagram of an illustrative system for retrieving and modifying a second version of the social media post, in accordance with some embodiments of the present disclosure.
Figure 4:
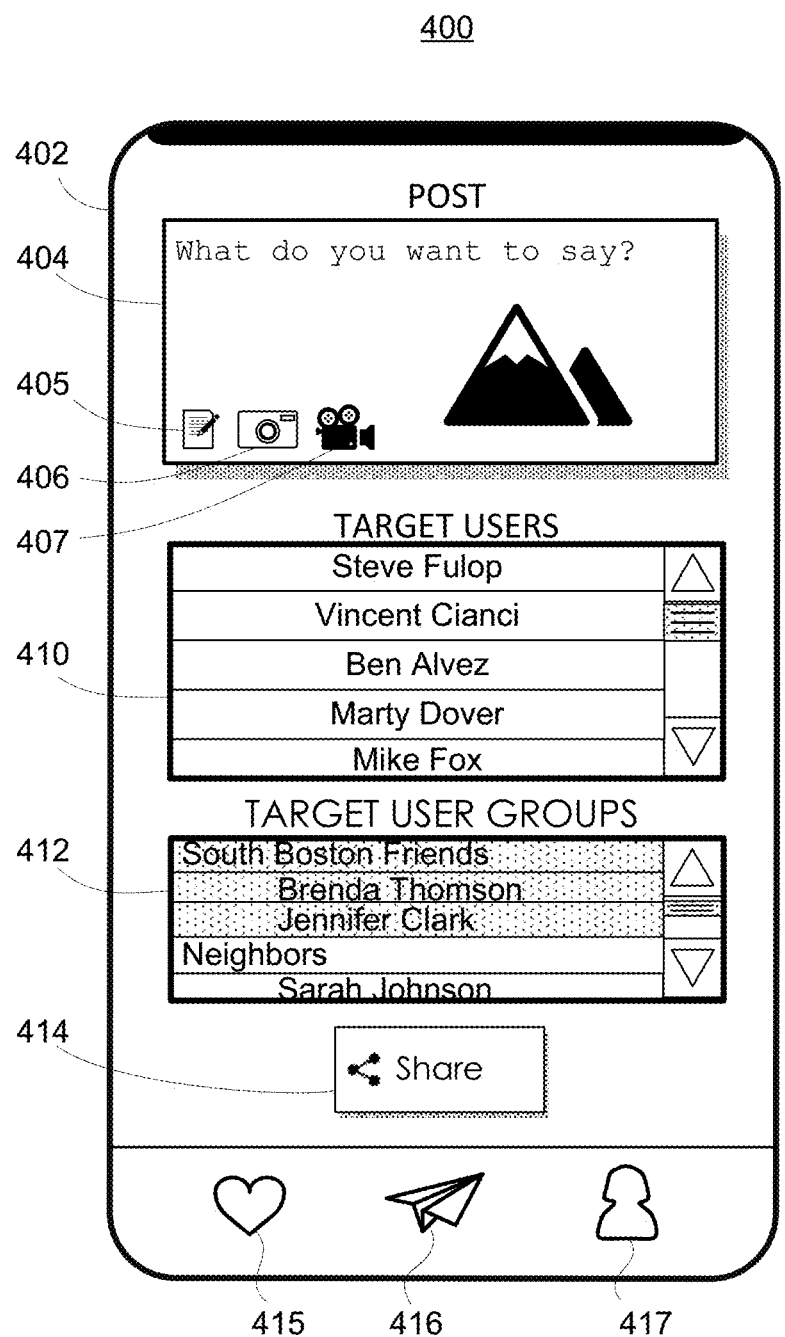
FIG. 4 depicts an illustrative device display for inputting a social media post to be shared, in accordance with some embodiments of the present disclosure.

FIG. 1 is a block diagram of an illustrative system 100 for retrieving and modifying a version of a social media post. In some embodiments, system 100 may be executed by processing circuitry of user device 400 (FIG. 4). It should be noted that system 100 or any step thereof could be performed on, or provided by, the system of FIG. 6. In addition, one or more steps of system 100 may be incorporated into or combined with one or more other steps described herein. As illustrated, social media post optimizer 150 receives social media post 102, and, from the database of social media posts 106, retrieves versions of the post, which include text and an image. This social media post may be shared 104 or can be generated by the sender. The social media post optimizer 150 will analyze the post for an identifier (not shown) and search a social media post database 106 for additional versions of the post. Upon retrieving additional versions of the post, the versions (106A, 106B, and 106C) are analyzed for quality based on the original publication. The social media post optimizer compares the metadata of each version (106A, 106B, and 106C) of the social media post. For example, the social media post optimizer determines the image in the first version 106A was taken on a cloudy and rainy day, the image in second version 106B has poor quality, and the image in third version 106C was taken on a sunny day with high pixel quality. The social media post optimizer may then select 110 the third version for further processing and customizing for the target users. In some embodiments, the version that is selected can be based on preferred criteria of the target user.

FIG. 1 continues at 112 to target user selection, where each user or user group has its own criteria for how they prefer their respective social media posts. The target user may include any entities such as, for example, users, devices, accounts, instances of an application, addresses (e.g., network addresses), while the target user group may include any other suitable entity, or any combination thereof. The users may include friends 112C connected on social media, family members 112B, coworkers 112A, or any other suitable users with access to the social media platform. Each of the users or target user groups may have preferred criteria for social media posts, for example, posts containing explanatory text, salutation text, images, action images, scenic images, videos, emojis, emoticons, or any other suitable preference or combination thereof.

FIG. 1 continues with the social media post optimizer modifying the selected version for customizing to each target user. For example, social media post optimizer 150 is configured to retrieve a plurality of versions of the social media post and select a second version of the social media post, and then modify the social media post based on a preference of a target user or a target user group to generate one or more modified versions of the social media post 116 for presentation to the associated target user or target user group. In some embodiments, system 100 may include other databases for modifying social media posts, instead of, or in addition to, social media post database 320. For example, system 100 may include a video database, an audio database, an image database, any other suitable database, or any combination thereof. Accordingly, a personalized post 116 may include a video, an audio clip, an image, a link (e.g., a hyperlink), any other suitable object, or any combination thereof. The modified posts are then transmitted to each target user or user group 116A, 116B, and 116C.

Figure 2:
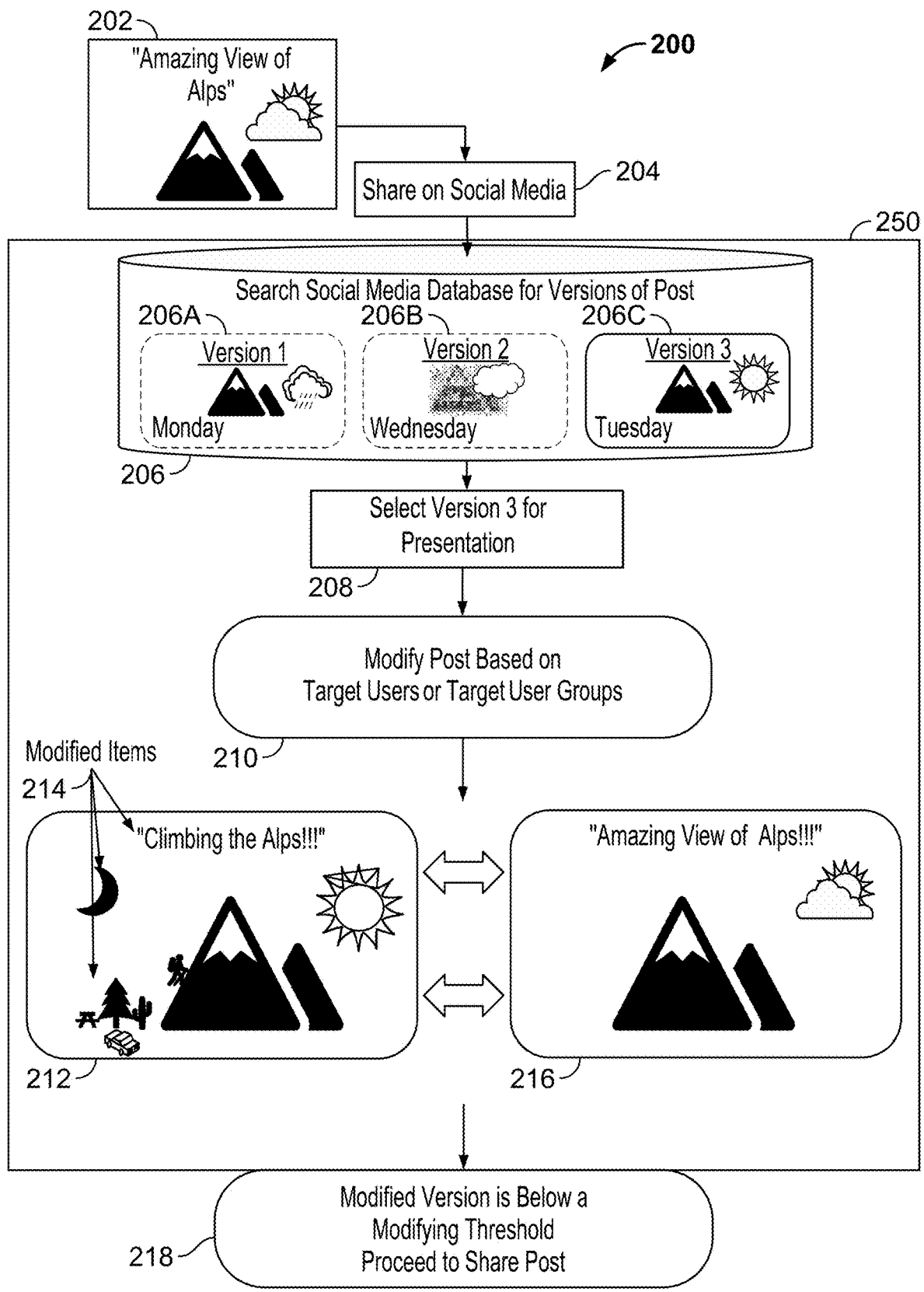
FIG. 2 is a block diagram of an illustrative system for comparing a number of modifications of a social media post to an original post, in accordance with some embodiments of the present disclosure.

FIG. 2 is a block diagram of an illustrative system for comparing a number of modifications of a social media post to an original post. In some embodiments, process 100 may be executed by processing circuitry of user device 400 (FIG. 4). It should be noted that process 100 or any step thereof could be performed on, or provided by, the system of FIG. 6. In addition, one or more steps of process 100 may be incorporated into or combined with one or more other steps described herein. As illustrated, social media post optimizer 250 receives social media post 202, and from the database of social media posts 206, retrieves versions of the post, which include text and an image. This social media post may be shared 204 or can be generated by the sender. The social media post optimizer 250 will analyze the post for an identifier (not shown) and search a social media post database 206 for additional versions of the post. Upon retrieving additional versions of the post, the versions (206A, 206B, and 206C) are analyzed for quality based on the original publication. The social media post optimizer compares the metadata of each version (206A, 206B, and 206C) of the social media post. For example, the social media post optimizer determines the image in the first version 206A was taken on a cloudy and rainy day, the image in the second version 206B has poor quality, and the image in the third version 206C was taken on a sunny day with high pixel quality. The social media post optimizer may then select 208 the third version 206C for further processing and customizing for the target users. In some embodiments, the version that is selected can be based on the preferred criteria of the target user.

In some embodiments, social media post optimizer 250 will analyze modified versions 212 of the post with the modifications 214 and original post 216 and determine whether the number of modifications to the version 212 exceeds the modifying threshold set by each target user. For example, each user may have a preference as to how much the post should be modified. In cases where the post exceeds the modifying threshold, the post may be forwarded but will likely not garner any attention. On the other hand, if the modified version of the post is below the modifying threshold, the modified version of the post is forwarded to the target user or target user group, it is likely going to provide an enhanced experience. In some embodiments, for each target user, the control circuitry (e.g., control circuitry 504) determines that the number of modifications exceeds the modifying threshold and performs corrective actions so that modifications fall below the threshold and post is transmitted.

Figure 3:
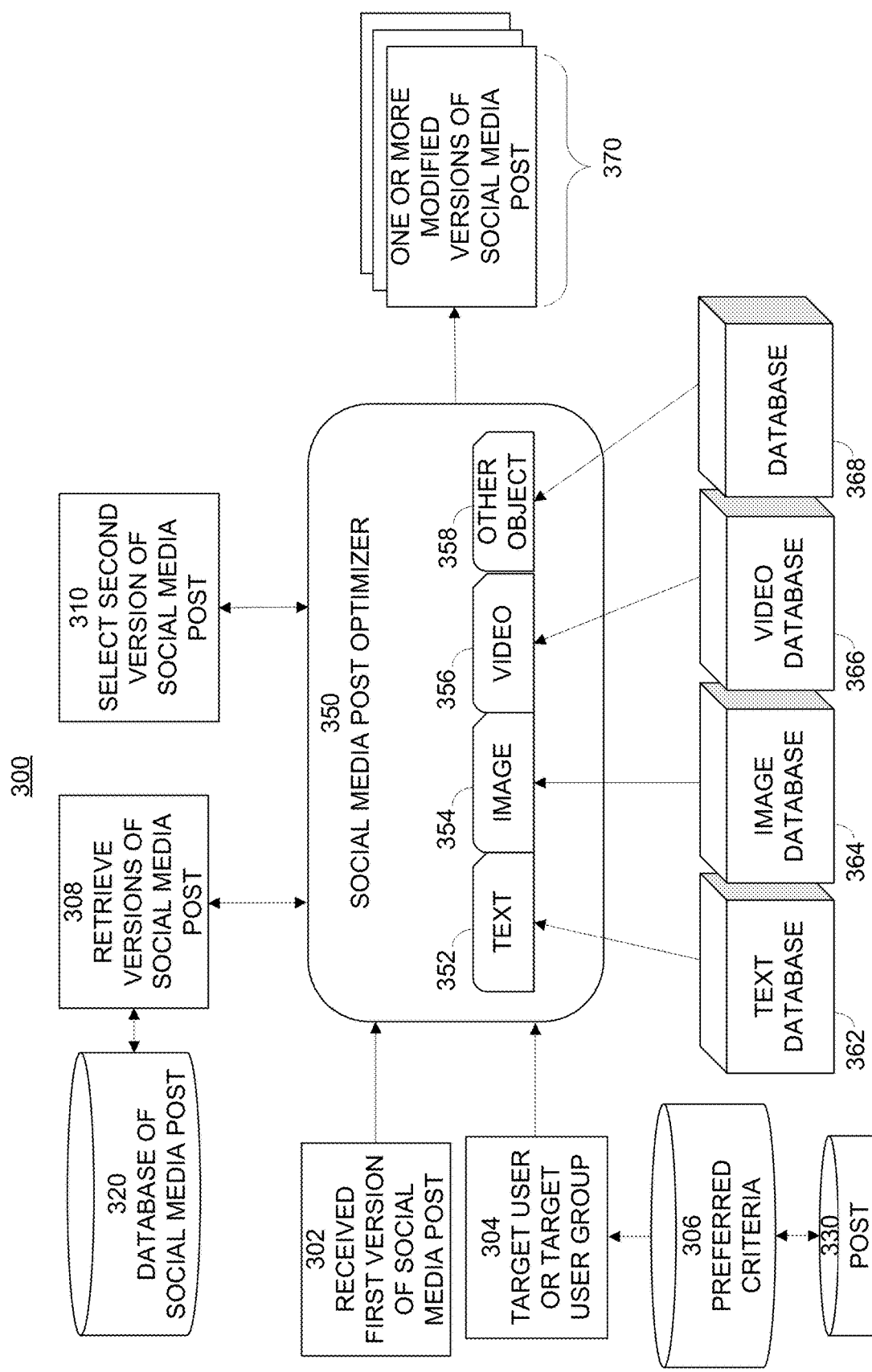
FIG. 3 is a block diagram of an illustrative system for optimizing social media posts, in accordance with some embodiments of the present disclosure.

FIG. 3 is a block diagram of illustrative system 300 for optimizing social media posts (e.g., a post, a Facebook Story®, an Instagram Story®, TikTok®). Social media post optimizer 350 receives a social media post (e.g., received first version of social media post 302) and a list of target users or target user groups (e.g., target user or target user group 304). Social media post optimizer 350 is configured to retrieve a plurality of versions of the social media post for a selection of a second version of the social media post, and then modify the social media post based on a preference of a target user or a target user group to generate one or more modified versions of the social media post 370 for presentation to the associated target user or target user group. Social media post optimizer 350 selects the second version of the social media post based on metadata of the second version indicative of a content type, a content quality, an original time publication and authorship for improved quality as compared to the first version. Social media post optimizer 350 is configured to access social media post database 320 to retrieve a plurality of versions for the received social media post 302. The plurality of versions may include posts such as, for example, text posts, still image posts, short video posts, video stories posts, posts with varying quality, post with varying angles, any other suitable versions of the post, or any combination thereof. Social media post optimizer 350 may select a second version, from the plurality of versions, that focuses on improved quality of the post. In some examples, the social media post optimizer 350 may select the second version based on improved content type, for example, the first version may include text and a still image, while the second version may include a short video or a video story post. In another example, social media post optimizer 350 may select a second version of the social media post 310 based on the preference of the target user or target user group. For example, the user or user group may prefer images rather than videos, or the user or user group may prefer receiving background and historical context of posts.

Social media post optimizer 350 may then apply one or more modifications to the selected second version of the post 310 to generate one or more modified versions of the social media post 370 based on the preferred criteria 306 of each of the target users or target user groups 304. The target users may include any entities such as, for example, users, devices, accounts, instances of an application, addresses (e.g., network addresses), while the target user group may include any other suitable entity, or any combination thereof. The users may include friends connected on social media, family members, coworkers, or any other suitable users with access to the social media platform. Each of the users or target user groups may have preferred criteria for social media posts, for example, posts containing explanatory text, salutation text, additional pictures, action images, scenic images, videos, emojis, emoticons, or any other suitable preference or combination thereof. Social media post optimizer 350 may apply one or more modifications, based on the preferred criteria of each user, to a second version of the social media post 310 to generate one or more modified versions of the social media post 370. For example, social media post optimizer 350 may apply text modification 352 based on text database 362. In a further example, social media post optimizer 350 may apply image modification 354 based on image database 364. In a further example, social media post optimizer 350 may apply video modification 356 based on video database 366. In a further example, social media post optimizer 350 may apply another modification 358 based on database 368. In an illustrative example, the first version of the social media post may include text, an image, a video, a story (e.g., entered into a smartphone); an email message (e.g., typed using a keyboard); a social media message (e.g., entered using an application on a smartphone); any other suitable message type, or any combination thereof.

Social media post optimizer 350 may be used when a user wants to share a post with a specific user or a group of people. Social media post optimizer 350 includes databases that include different message formats, templates, objects, or a combination thereof. Based on the social media post itself, as well as the preferred criteria between the sender and each of the users or user groups, social media post optimizer 350 may access the appropriate database for modifying the social media post. For example, social media post optimizer 350 may include post-modifying plug-ins (e.g., software modules) that are assigned a user name or user group name, sender name and the message to be sent. The plug-in may access the preferred criteria database (e.g., managed by a modifying analyzer) to find specific preferences for presentation of information such as broad grouping, narrow grouping, common phrases, or any other suitable information. The plug-in may then modify the post by adding salutations, emojis, or other suitable modifications that result in one or more modified versions of the social media post.

In an illustrative example, social media post optimizer 350 identifies a type of the second version of the social media post 370 to be shared and invokes an appropriate plug-in, application, module, or combination thereof. For each user or user group, the plug-in identifies aspects of the second version of the social media post that can be modified. For example, the plug-in may access a predetermined plug-in dictionary for this purpose. The plug-in accesses the preferred criteria database to determine preferred criteria for the user or user group. The plug-in then generates one or more modified versions of the post for presentation with each respective user or group of users. In some embodiments, social media post optimizer 350 may generate one or more modified versions of the social media post in parallel, in series, or a combination thereof. For example, an instance of the plug-in may repeat operations to generate one or more modified versions sequentially (e.g., in series). In a further example, multiple instances of the plug-in may operate in parallel to generate one or more modified versions in parallel. Referencing FIG. 3, text modification 352 may include a text plug-in configured to access database 362, image modification 354 may include an image plug-in configured to access database 364, video modification 356 may include a video plug-in configured to access database 366, and other modification 358 may include a plug-in configured to access database 368. For example, each plug-in may access a respective database, or the same database, using search keys. In a further example, a text plug-in may be configured to categorize versions of the social media post as related to salutations, historical information, well-wishes, greetings, events (e.g., festivals, holidays). In some embodiments, the text plug-in is configured to extract context using keywords (e.g., "Christmas," "Diwali," "Birthday," or any other suitable keyword). In a further example, an image plug-in may be configured to determine background and object identifiers along with text scrapers to identify a greeting type. The video plug-in may be configured to extend the image plug-in by repeating across frames of images. Once constructs of the message have been determined, the plug-in then begins personalization by accessing the relationship entity database to determine a relationship (e.g., although this may occur in any suitable order). For example, a text plug-in may be configured to insert salutations, insert emojis, change fonts, change language, change the wording, or a combination thereof. In a further example, an image plug-in may be configured to change texts in images, change background colors, change attached images, or a combination thereof. In a further example, a video plug-in may be configured to insert customized texts (e.g., an overlay) to a video message, insert a video clip in a version of the social media, or a combination thereof.

Social media post database 320 includes a structured collection of information corresponding to social media posts among entities, for example, social media posts that have been shared on a social media platform. In some embodiments, social media post database 320 includes identifiers among stored posts. For example, identifiers may include a location identifier, an image identifier, a text identifier, and a video identifier. The identifiers may identify a category of each social media post relative to all types of social media posts. To identify versions of the same social media post, the social media post optimizer 350 can search for a post with similar identifiers. A version of the same post may include, for example, similar senders (e.g., users, persons, devices); a similar device (e.g., user devices, network devices); locations corresponding to the first version of the post; locations corresponding to devices, network entities, addresses (e.g., location-based or network-based), accounts (e.g., social media accounts, messaging services accounts), image identifier, any other suitable entity that corresponds to a version of the post sender or receiver, or any combination thereof. The plurality of versions may include, for example, a shared location between the versions, a context of similar background between the versions (e.g., person to person), a category similar between the versions, a communications network (e.g., devices on a particular network, devices hosting a particular application), a linkage in an application (e.g., versions linked in a social network or messaging application), any other suitable relationship type, or any combination thereof. For example, a relationship identifier may include a relationship between two versions (e.g., identified by a hardware address, IP address, device name, or other suitable identifiers) that may correspond to the first version and the plurality of versions retrieved from the database 320. For example, a device may be configured to retrieve versions of the social media post to share with users or groups of users, without input or modification from the sender. In some embodiments, social media post optimizer 350 accesses social media post database 320, transmits version identifiers (e.g., of content) to social media post database 320 (e.g., using a query), and retrieves a plurality of the versions of the social media post (e.g., identifying a version such as a video, image with higher quality, an image with improved vantage point).

In some embodiments, social media post optimizer 350 retrieves template information from template database 330. Template database 330 may include one or more templates for parsing a social media post into sections. For example, a template may be configured to identify a salutation, a name, a message body, a sentence, a phrase, a send-off, an attachment, metadata associated with the social media post, a format of the social media post, any other attribute of the message, or any combination thereof. In some embodiments, the social media post optimizer 350 applies a plurality of templates to determine which most closely matches the social media post format. In some embodiments, social media post optimizer 350 transmits the version of the social media post and corresponding metadata to template database 330. In some embodiments, social media post optimizer 350 retrieves a plurality of templates from template database 330 and then applies the templates to the social media post to determine which template best fits. In some embodiments, social media post optimizer 350 may determine the social media post format based on which template fits a matching criterion of the parts of the social media post. For example, a selected second version of the social media post has a salutation, a message body, a send-off, and a signature may best match, based on the system parsing the social media post template having those components.

In some embodiments, template database 330 includes templates for formatting one or more modified versions of the social media post. In some embodiments, a template includes instructions, criteria, or other features by which the system may determine how to format a version of the social media post, determine a format of a version of the social media post, or both. For example, social media post optimizer 350 may receive a version of the social media post and a target user or user group, each having a corresponding preferred criterion, which is associated with a template database 330. In some cases, the template database 330 may be associated with a group of users.

In some embodiments, the sender may have a static relationship or a dynamic relationship with the users or user groups. A static relationship with users or user groups can include family members, coworkers, or friends. For example, a group of users may be "coworkers" and may have an associated template that includes more formal salutations, message structure, and send-off, and more appropriate images and videos that may avoid offending a coworker. In a further example, the template for a group of users from the "coworker" group may apply a spelling check, a grammar check, replacement of abbreviations, replacement of phrases or words (e.g., to remove profanity, slang, or informal text), removal of images or video, any other suitable formatting appropriate for the group of users, or any combination thereof. For example, in audio, video, and image posts, inappropriate imageries and sounds can be modified by overlay imagery or audio or muting. In a further example, the template for recipient category "friends" need not apply a spelling check or a grammar check, and may replace longhand words or phrases with abbreviations or other shorthand (e.g., determined from communications records), any other suitable formatting appropriate for the user category, or any combination thereof. A dynamic relationship can be identified by the frequency and quality of the latest conversation. The dynamic relationship can be based on the age of each user and sender, mood, latest conversation, habits, or any other suitable categories or a combination thereof. Each user's or group of user's likes and dislikes can be identified based on their respective age, mood, latest conversation, or habits. For example, the user may have recently liked a scenic image of a particular tourist destination. Accordingly, the user's interaction can assist in generating a template based on scenic images or scenic videos. In an example, the template for a group of users from the dynamic relationship may be selected based on the social media post format to guide the structure of the one or more modified versions of the social media post.

In some embodiments, social media post optimizer 350 may determine a social media post based on contextual information of the message. For example, social media post optimizer 350 may determine a context of a received message, and then select a template that corresponds to the context. In an illustrative example, social media post optimizer 350 may determine that a selected second version of the media content post includes a dinner invitation to a plurality of guests. Social media post optimizer 350 may retrieve from template database 330 a template corresponding to an event invitation, which may include text relevant to an invitation (e.g., "you are invited to:," a date, a time, a theme). In a further example, social media post optimizer 350 may determine a context of a post be holiday-related and may accordingly select a template that includes holiday-themed images or videos to be included in the post. Social media post optimizer 350 may use any suitable criteria to select a template from template database 330.

FIG. 4 depicts an illustrative device display 400 for inputting a social media post to be shared. Device 400 may include a smartphone or other suitable user device configured to share social media content inputted by a sender. As illustrated, device display 402 shows a text entry region 404 with icons 405-407, list of potential target users 410, list of target user groups 412, share button 414 configured to receive a user indication to optimize a social media post, and icons 415-417 for indicating user instructions in navigating the displayed software application.

Text entry region 404 may include a displayed cursor and may display text inputted by a sender. For example, the sender may provide haptic interaction to the screen of device 400 by touching displayed keys of a displayed keyboard. In a further example, a sender may elect to forward a social media post displayed in the text entry region 404. Icon 405 corresponds to inserting text into text entry region 404. For example, when a user selects icon 405 (e.g., touching the region of the screen corresponding to icon 405), a touchscreen keyboard may be displayed. Icon 406 corresponds to inserting an image into text entry region 404. For example, when a sender selects icon 406 (e.g., touching the region of the screen corresponding to icon 406), a file folder, directory, camera application, or thumbnail gallery of stored images may be displayed. Icon 407 corresponds to inserting a video into text entry region 404. For example, when a sender selects icon 407 (e.g., touching the region of the screen corresponding to icon 407), a file folder, directory, camera application, or thumbnail gallery of stored videos may be displayed.

Target users 410, as illustrated, includes a list of users to whom the social media post may be forwarded. For example, a list of target users 410 may include a contacts list stored in the Memory of device 400. In a further example, the list of target users 410 may include users with whom the sender has communicated using device 400, an application of device 400, a list of social media network entities connected to the sender, or any combination thereof. List of target users 410, as illustrated, includes a vertical list with a scroll bar for navigating the list.

List of target user groups 412 includes a list of broad group identifiers such as "South Boston Friends" and "Neighbors" as illustrated. In some embodiments, recipients of list of target users 410 may be grouped into broad groupings in list of user groups 412. List of user groups 412, as illustrated, includes a vertical list with a scroll bar for navigating the list, with a listing of corresponding users provided for each user group.

Share button 414 may be selected by a sender (e.g., by touching the region of the screen corresponding to share button 414) to generate one or more versions of the social media post. Icons 415, 416, and 417 may be used to navigate the software messaging application displayed. For example, as illustrated, icon 416 indicates a "send post" screen (e.g., currently displayed), on which the user may compose a post and, select target user and forward the social media post.

In an illustrative example, a user may input a social media post to text entry region 404, select a plurality of recipients from either list of target users 410 or list of user groups 412, and generate one or more modified versions of the social media post by selecting share button 414.

Figure 5:
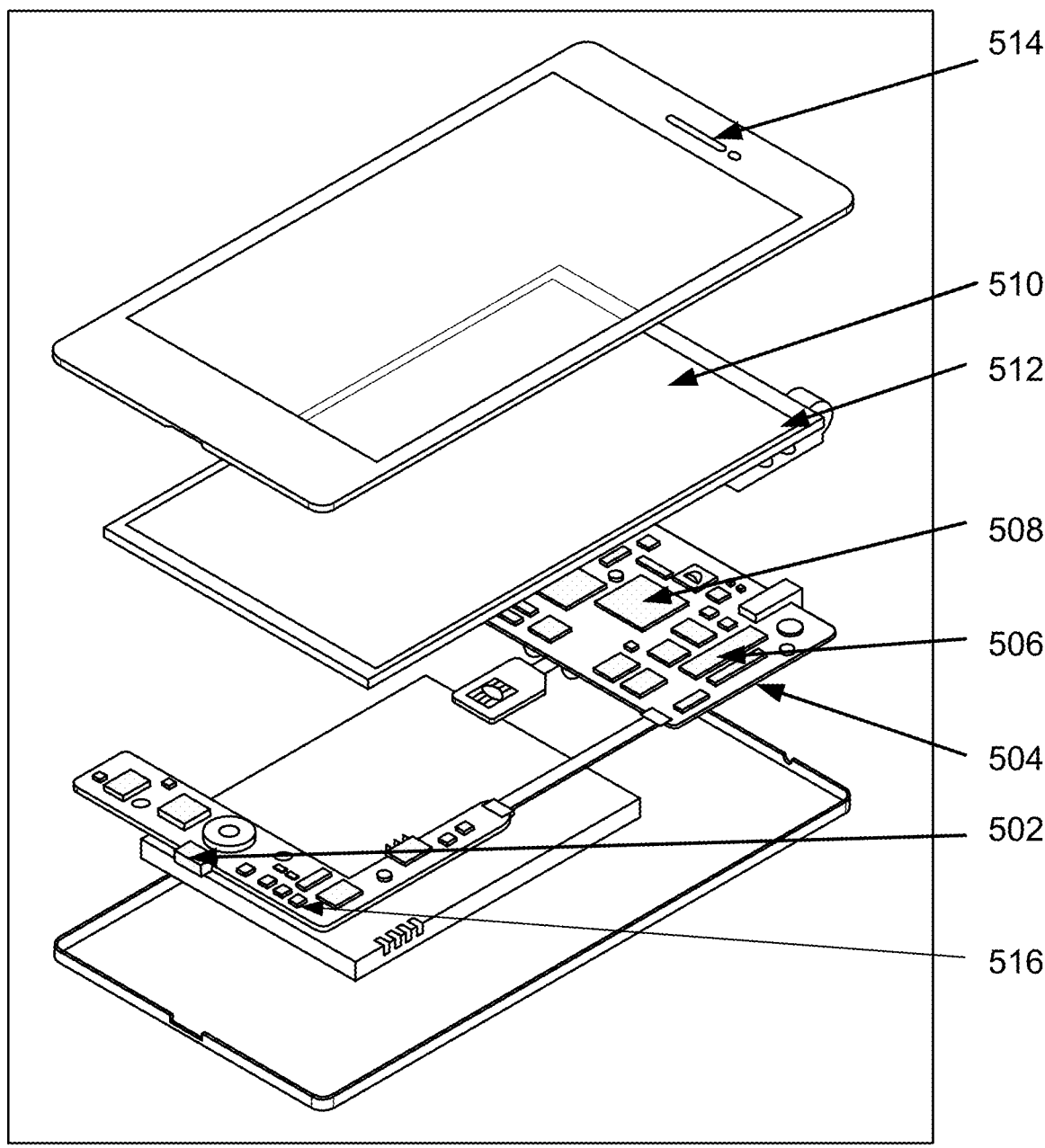
FIG. 5 is a block diagram of an illustrative user device, in accordance with some embodiments of the present disclosure.

FIG. 5 is a block diagram of an illustrative user device. A user may access content, an application, and other features from one or more of their devices (i.e., user equipment). FIG. 5 shows generalized embodiments of an illustrative user device. Although illustrated as a mobile user device (e.g., a smartphone), user device 500 may include any user electronic device with which a sender may share social media posts with other users. For example, a user device 500 may include a desktop computer, a tablet, a laptop, a remote server, any other suitable device, or any combination thereof. In some embodiments, display 512 may include a touchscreen, a television display or a computer display. In some embodiments, the one or more circuit boards illustrated include processing circuitry, control circuitry, and storage (e.g., RAM, ROM, Hard Disk, Removable Disk, etc.). In some embodiments, circuit boards include an input/output (hereinafter "I/O") path. User device 500 may receive content and data via I/O path 502. I/O path 502 may provide content and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry is distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for an application stored in memory (e.g., storage 508). Specifically, control circuitry 504 may be instructed by the application to perform the functions discussed above and below. For example, the application may provide instructions to control circuitry 504 to generate media guidance displays. In some implementations, any action performed by control circuitry 504 may be based on instructions received from the application.

In some client/server-based embodiments, control circuitry 504 includes communications circuitry suitable for communicating with an application server or other networks or servers. The instructions for carrying out the above-mentioned functionality may be stored on the application server. Communications circuitry may include a cable modem, an integrated-services digital network (ISDN) modem, a digital subscriber line (DSL) modem, a telephone modem, an ethernet card, a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, solid state devices, quantum storage devices, gaming consoles, gaming media, any other suitable fixed or removable storage devices, and/or any combination of the same. Storage 508 may be used to store various types of content described herein as well as media guidance data described above. Non-volatile memory may also be used (e.g., to launch a boot-up routine and other instructions). Cloud-based storage, for example, may be used to supplement storage 508 or instead of storage 508.

A user may send instructions to control circuitry 504 using user input interface 510. The user input interface 510, display 512, or both, may include a touchscreen configured to provide a display and receive haptic input. For example, the touchscreen may be configured to receive haptic input from a finger, a stylus, or both. In some embodiments, user device 500 may include a front-facing screen and a rear-facing screen, multiple front screens, or multiple angled screens. In some embodiments, user input interface 510 includes a remote-control device having one or more microphones, buttons, keypads, any other components configured to receive user input or combinations thereof. For example, user input interface 510 may include a handheld remote-control device having an alphanumeric keypad and option buttons.

Audio equipment 514 may be provided as integrated with other elements of user device 500 or may be stand-alone units. The audio component of videos and other content displayed on display 512 may be played through speakers of audio equipment 514. In some embodiments, the audio may be distributed to a receiver (not shown), which processes and outputs the audio via speakers of audio equipment 514. In some embodiments, for example, control circuitry 504 is configured to provide audio cues to a user, or other audio feedback to a user, using speakers of audio equipment 514. Audio equipment 514 may include a microphone configured to receive audio input, such as voice commands or speech. For example, a user may speak letters or words that are received by the microphone and converted to text by control circuitry 504. In a further example, a user may input voice commands that are received by the microphone and recognized by control circuitry 504.

An application (e.g., for generating a display) may be implemented using any suitable architecture. For example, a stand-alone application may be wholly implemented on user device 500. In some such embodiments, instructions for the application are stored locally (e.g., in storage 508), and data for use by the application is downloaded on a periodic basis (e.g., from an out-of-band feed or an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected. An application and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or it may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

In some embodiments, the application is a client/server-based application. Data for use by a thick or thin client implemented on user device 500 is retrieved on-demand by issuing requests to a server remote from user device 500. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on user device 500. This way, the processing of the instructions is performed remotely by the server while the resulting displays (e.g., that may include text, a keyboard, or other visuals) are provided locally on user device 500. User device 500 may receive inputs from the user via input interface 510 and transmit those inputs to the remote server for processing and generating the corresponding displays. For example, user device 500 may transmit a communication to the remote server, indicating that an up/down button was selected via input interface 510. The remote server may process instructions in accordance with that input and generate a display of the application corresponding to the input (e.g., a display that moves a cursor up/down). The generated display is then transmitted to user device 500 for presentation to the user.

In some embodiments, the application is downloaded and interpreted or otherwise run by an interpreter or virtual machine (e.g., run by control circuitry 504). In some embodiments, the application may be encoded in the ETV Binary Interchange Format (EBIF), received by control circuitry 504 as part of a suitable feed, and interpreted by a user agent running on control circuitry 504. For example, the application may be an EBIF application. In some embodiments, the application may be defined by a series of Java-based files that are received and run by a local virtual machine or other suitable middleware executed by control circuitry 504.

Figure 6:
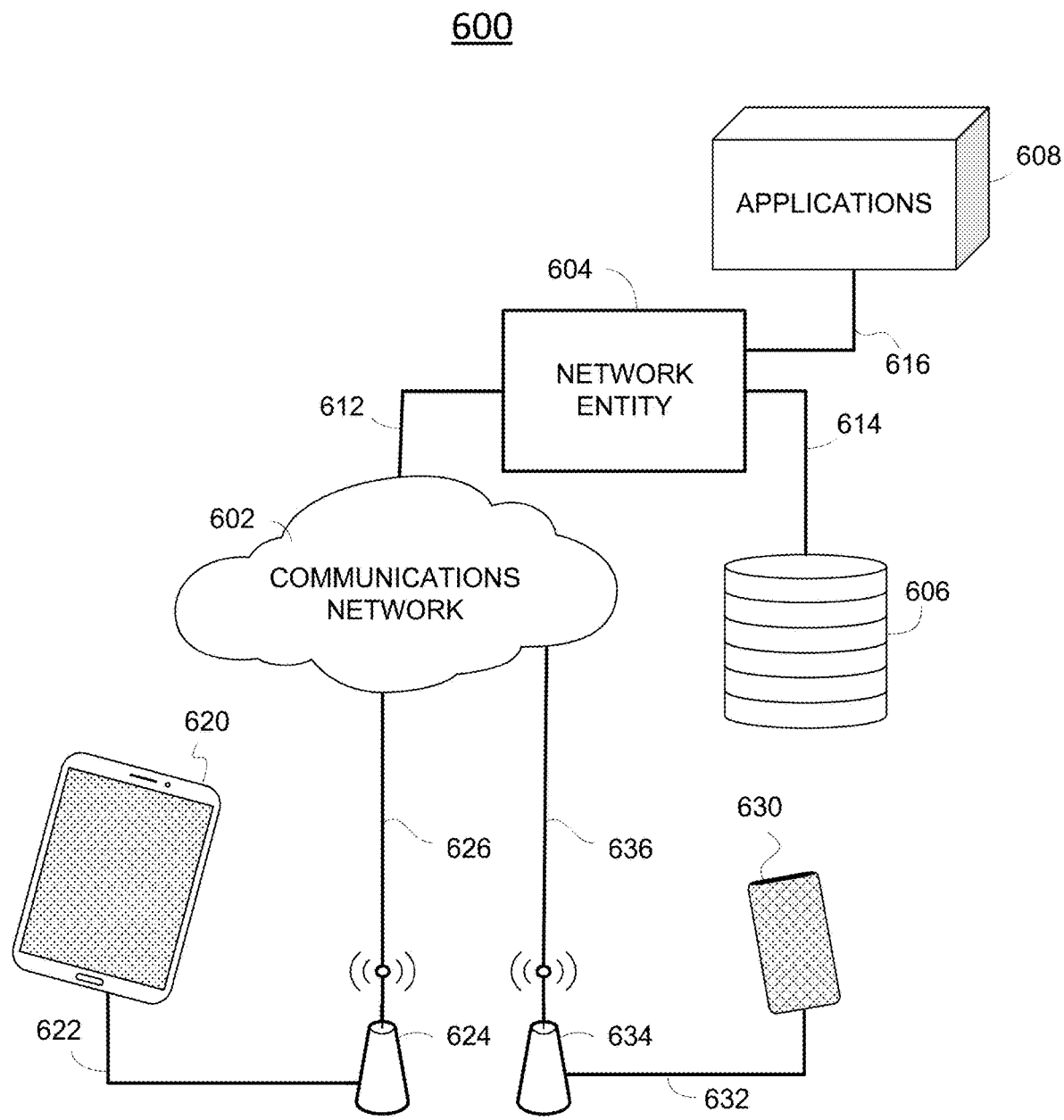
FIG. 6 is a block diagram of an illustrative system for transmitting a social media post to target users or target user groups, in accordance with some embodiments of the present disclosure.

FIG. 6 is a block diagram of an illustrative system 600 for transmitting social media posts to target users or target user groups. In system 600, there may be more than one of each type of user device, but only one of each is shown in FIG. 6 to avoid overcomplicating the drawing. In addition, each user may utilize more than one type of user device and also more than one of each type of user device. In some embodiments, a user device (e.g., user device 630, user computer equipment 620) may be referred to as a "second screen device." For example, a second screen device may supplement content, software applications, or other functionality presented on a first user device. As illustrated, a first user may use user device 620, and a second user may use user device 630 (e.g., a sender and a recipient of a message).

User devices 620 and 630, illustrated as wireless-enabled devices, may be coupled to communications network 602 (e.g., the Internet). For example, user device 620 is coupled to communications network 602 via communications path 622 to access point 624 and wired connection 626, and user device 630 is coupled to communications network 602 via communications path 632 to access point 634 and wired connection 636. User devices 620 and 630 may also include wired connections to a LAN, or any other suitable communications link to network 602. Communications network 602 may be one or more networks including the Internet, a mobile phone network, mobile voice or data network (e.g., a 4G or LTE network), cable network, public switched telephone network, or other type of communications network or combination of communications networks. Paths 612, 626, and 636 may separately or together include one or more communications paths, such as a satellite path, a fiber-optic path, a cable path, a path that supports Internet communications, free-space connections (e.g., for broadcast or other wireless signals), or any other suitable wired or wireless communications path or combination of such paths. Although communications paths are not drawn between user devices 620 and 630, these devices may communicate directly with each other via communications paths, such as those described above in connection with paths 626 and 636, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 602.

System 600 includes network entity 604 (e.g., a server or other suitable computing device) coupled to communications network 602 via communications path 612. Path 612 may include any communications path described above in connection with paths 626 and 636. Communications with network entity 604 may be exchanged over one or more communications paths but are shown as a single path in FIG. 6 to avoid overcomplicating the drawing. Network entity 604 is configured to access database 606 or applications 608 (e.g., an application database or host server) via communications links 614 and 616, respectively. Although shown as a separate device, network entity 604 may include database 606 and applications 608 (e.g., stored in memory). In addition, there may be more than one of each of database 606 and applications 608, but only one of each is shown in FIG. 6 to avoid overcomplicating the drawing. In some embodiments, database 606 and applications 608 may be integrated as one source device (e.g., that may be, but need not be, network entity 604). Although communications between database 606 and applications 608 with user devices 620 and 630 are shown as through communications network 602, in some embodiments, database 606 and applications 608 may communicate directly with user devices 620 and 630 via communications paths (not shown) such as those described above.

Database 606 may include one or more types of stored information, including, for example, a social media posts database, user and user group information, user-preferred criteria database, post template database, user profile information, text database, image database, video database, any other suitable information, or any combination thereof. Applications 608 may include an applications-hosting database or server, plug-ins, a software developers kit (SDK), an applications programming interface (API), or other software tools configured to provide software (e.g., as a download to a user device), run software remotely (e.g., hosting applications accessed by user devices), or otherwise provide applications support to applications of user devices 620 and 630. In some embodiments, information from network entity 604, database 606, applications 608, or a combination thereof may be provided to a user device using a client/server approach. For example, user device 620 or user device 630 may pull information from a server, or a server may push information to user device 620 or user device 630. In some embodiments, an application client residing on user device 620 or user device 630 may initiate sessions with database 606, applications 608, network entity 604, or a combination thereof to obtain information when needed (e.g., when data is out-of-date or when a user device receives a request from the user to receive data). In some embodiments, information may include user information. For example, the user information may include current and/or historical user activity information (e.g., what communications the user engages in, what times of day the user sends/receives messages, whether the user interacts with a social network, at what times the user interacts with a social network to post information, what types of content the user typically inserts in messages, stored contacts of the user, frequent contacts of the user, any other suitable information, or any combination thereof. In some embodiments, the user information may identify patterns of a given user for a period of more than one year.

In some embodiments, an application may include a social media post optimizer as a stand-alone application implemented on user devices 620 and 630. For example, the application may be implemented as software or a set of executable instructions, which may be stored in storage (e.g., storage 508) of the user devices (e.g., user device 500), and executed by control circuitry (e.g., control circuitry 504) of the user devices (e.g., user device 500). In some embodiments, an application may include a social media post optimizer application that is implemented as a client/server-based application where only a client application resides on the user device, and a server application resides on a remote server (e.g., network entity 604). For example, social media post optimizer applications may be implemented partially as a client application on user device 620 or user device 630 (e.g., by control circuitry 504 of user device 500) and partially on a remote server as a server application running on control circuitry of the remote server (e.g., control circuitry of network entity 604). When executed by control circuitry of the remote server, the social media post optimizer application may instruct the control circuitry to generate the displays and transmit the generated displays to user devices 620 and 630. The server application may instruct the control circuitry of the remote device to transmit data for storage on user device 620 or user device 630. The client application may instruct control circuitry of the receiving user device to generate the application displays.

In some embodiments, the arrangement of system 600 is a cloud-based arrangement. The cloud provides access to services, such as information storage, messaging, or social networking services, among other examples, as well as access to any content described above, for user devices. Services can be provided in the cloud through cloud computing service providers, or through other providers of online services. For example, the cloud-based services can include a storage service, a sharing site, a social networking site, or other services via which user-sourced content is distributed for viewing by others on connected devices. These cloud-based services may allow a user device to store information to the cloud and to receive information from the cloud rather than storing information locally and accessing locally stored information. Cloud resources may be accessed by a user device using, for example, a web browser, a messaging application, a desktop application, a mobile application, and/or any combination of access applications of the same. The user device may be a cloud client that relies on cloud computing for application delivery, or the user equipment device may have some functionality without access to cloud resources. For example, some applications running on the user device may be cloud applications (e.g., applications delivered as a service over the Internet), while other applications may be stored and run on the user device. In some embodiments, a user device may receive information from multiple cloud resources simultaneously.

Figure 7:
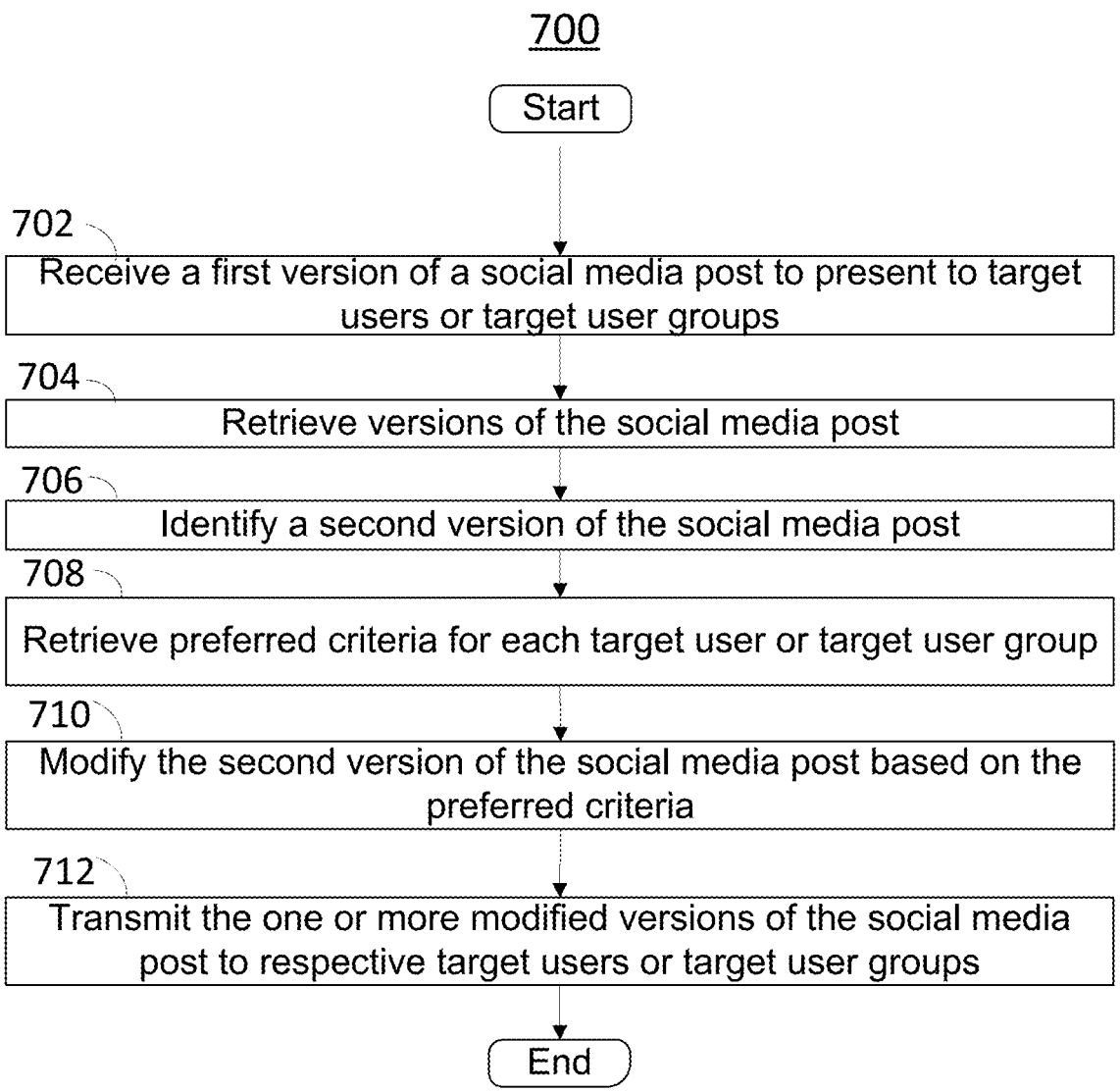
FIG. 7 shows a flowchart of an illustrative process for retrieving and modifying a version of a social media post, in accordance with some embodiments of the present disclosure.

FIG. 7 shows a flowchart of an illustrative process for retrieving and modifying a second version of the social media post. In some embodiments, user device 500 may be used to perform the illustrative steps of process 700. A process 700 for optimizing social media post versions with content that is relevant to the consumer of the post may begin at block 702. For example, control circuitry 504 of media device 630 may receive an input of a first version of social media post 502 and/or a user selection, such as via user input interface 510, of social media post 310.

At step 702, control circuitry (e.g., control circuitry 504) receives a social media post to present to target users and target user groups. In some embodiments, a sender may forward/share a social media post (e.g., to user input interface 510, display 512 on a touchscreen, or both of a user device). For example, a sender may receive a post and may desire to share that post. Accordingly, the sender may share the social media post on a social media platform, after performing some modifications using an electromechanical keyboard (e.g., a USB keyboard) or a touchscreen keyboard, or may speak a message into a microphone (e.g., of audio equipment 514) of a user device, and control circuitry (e.g., control circuitry 504) may identify words, commands, or phrases, and convert them to text. In an illustrative example, as shown in FIG. 4, a user may share a social media post to a user device using a messaging application. In some embodiments, the control circuitry may optimize the social media post to generate one or more social media posts that will be modified to broadcast to target users or target user groups based on their preference.

At step 704, control circuitry (e.g., control circuitry 504) retrieves versions of the social media post of the received first social media post of step 702. In some embodiments, the social media post may have many formats. For example, the format may include text, an image, a video, a story, any other suitable element of a post, or any combination thereof.

At step 706, control circuitry (e.g., control circuitry 504) identifies a second version of the plurality of versions of the social media post. In some embodiments, a sender may specify the criteria for the second version. For example, the sender may prefer versions with videos only, or pictures only. In some embodiments, the system considers the quality of each of the versions and selects the second version based on the highest-quality.

At step 708, control circuitry (e.g., control circuitry 504) retrieves preferred criteria for each of the target users or target user groups. In some embodiments, each target user is compared against a database of users (e.g., a relationship entity database) to determine a target user's category (e.g., a relationship). A target user's category may include a relationship identifier (e.g., coworker, boss, friend, family member, significant other, acquaintance, first friend group, second friend group), a grouping based on social media post preferences, any other suitable categorization, or any combination thereof. In some embodiments, the control circuitry (e.g., control circuitry 504) retrieves information from a server, database or other network device. For example, in some embodiments, the control circuitry provides a name to a database as input, searches for a matching entry and then extracts the relationship type from the entry. In some embodiments, target user categories may be stored on the user device. For example, in some embodiments, a contact list may include, for each contact, one or more categories to which that contact belongs.

At step 710, control circuitry (e.g., control circuitry 504) modifies the second version of the social media post for each of the target users based on the preferred criteria. For each target user category, the control circuitry may determine a post format, a post template, a set of text, images, or video to apply, any other suitable edits to the message, or any combination thereof. In some embodiments, the control circuitry determines one or more modified versions of the social media post for each recipient category. In some embodiments, the control circuitry determines one or more modified versions of the social media post for each target user. In some embodiments, a social media post optimizer determines an appropriate plug-in, application, module, or combination thereof to use for generating one or more modified versions of the social media post. For each target user or target user group, the social media post optimizer selects a version of the post that is the highest-quality. In some embodiments, the social media post optimizer selects a version of the post that has the earliest publication. The selected version of the post is then modified using the preferences of each of the target users. For example, the social media post optimizer may access a predetermined database for this purpose.

The social media post optimizer may, for example, access a target user database to determine personalization options (preferred criteria or template) for each target user. The social media post optimizer then retrieves versions of the post to determine if a version exists that is better quality. The social media post optimizer then selects a version of the post based on the quality of the version. The social media post optimizer then modifies the selected version to form one or more modified versions of the post tailored to the target users. In some embodiments, the social media post optimizer may generate one or more modified versions in parallel, in series, or a combination thereof. For example, a text plug-in may be configured to insert salutations, insert emojis, change fonts, change language, change the wording, or a combination thereof. In a further example, an image plug-in may be configured to change texts in images, change background colors, change attached images, or a combination thereof. In a further example, a video plug-in may be configured to insert customized texts (e.g., an overlay) to a video message, insert a video clip in a text message, or a combination thereof. One or more modified versions of the post may be stored in storage (e.g., storage 508) of a user device, any other suitable storage, or any combination thereof.

At step 712, control circuitry (e.g., control circuitry 504) transmits the one or more modified versions of the social media post. In some embodiments, the control circuitry generates the one or more modified versions for transmission in a series, one after another. In some embodiments, at least one of the modified versions may be of a different type. For example, some of the one or more modified versions of the social media post may be on one application (e.g., What's Up®) while other modified versions may be on another application (e.g., TikTok®). The control circuitry may generate for transmission one or more modified versions of the social media post of a particular type first, and then proceed to generate one or more modified versions of the social media post of a different type for transmission. In some embodiments, one or more modified versions of the social media post are generated for broadcast transmission, posting (e.g., on a social media page or feed), instant messaging, transmission to a message server, or a combination thereof.

In an illustrative example of process 800, a social media post optimizer receives a post from a sender to transmit to a plurality of target users. For each target user of the plurality of target users, the social media post optimizer identifies a plurality of versions of the post and, selects a version of the post based on target user preferences. The social media post optimizer modifies the post based on the preferences of each target user and identifies a relationship for each target user. In some embodiments, identifying each respective relationship identifier includes accessing historical communications records stored in a database. In some embodiments, for example, the stored historical communications records include a chat group record, contacts list, text message record, email message record, social media post record, and comments record or a combination thereof corresponding to a media post. In some embodiments, the social media post optimizer extracts one or more patterns of conversation from the historical communications records, determines a relationship identifier based on the one or more patterns of conversation, and stores the relationship identifier in a database. In some embodiments, determining the one or more modifiers to apply includes determining a modification to one of a salutation, a closing, and a displayed object. In some embodiments, determining one or more modifiers includes determining one or more message templates to apply to the social media post. For example, determining the one or more templates may include identifying an object in the post, determining a contextual indicator based at least in part on the object, and modifying one or more of a word, an emoticon, and a visual attribute of the message based on the contextual indicator. In an illustrative example, the one or more modifiers may include one of a text modifier, an image modifier, and a video modifier.

Figure 8:
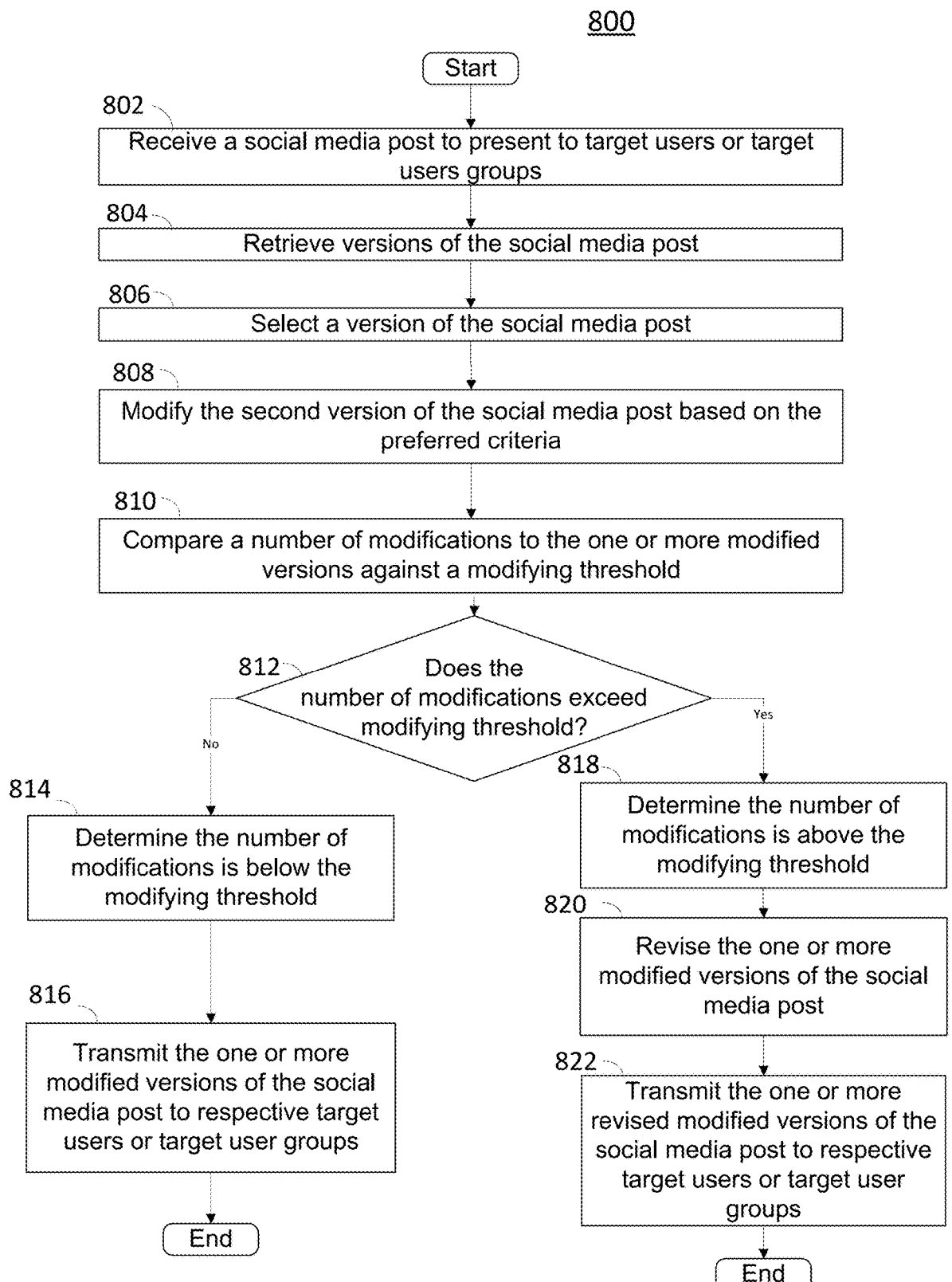
FIG. 8 shows a flowchart of an illustrative process for comparing a number of modifications of a social media post to an original post, in accordance with some embodiments of the present disclosure.

FIG. 8 shows a flowchart of an illustrative process for comparing a number of modifications of a social media post to an original post. In some embodiments, user device 500 may be used to perform the illustrative steps of process 800. A process 800 for optimizing social media post versions with content that is relevant to the user of the post may begin at block 802. For example, control circuitry 504 of media device 630 may receive an input of a first version of social media post 302 and/or a user selection, such as via user input interface 510, of social media post 310.

At step 802, control circuitry (e.g., control circuitry 504) receives a social media post to present to a target users and target user groups. In some embodiments, a sender may forward/share a social media post (e.g., to user input interface 510, display 512 on a touchscreen, or both of a user device). For example, a sender may receive a post and may desire to share that post. Accordingly, the sender may share the social media post on a social media platform, after performing some modifications using an electromechanical keyboard (e.g., a USB keyboard) or a touchscreen keyboard, or may speak a message into a microphone (e.g., of audio equipment 514) of a user device, and control circuitry (e.g., control circuitry 504) may identify words, commands, or phrases, and convert them to text. In an illustrative example, as shown in FIG. 4, a user may share a social media post to a user device using a messaging application. In some embodiments, the control circuitry may optimize the social media post to generate one or more social media posts that will be modified to broadcast to target users or target user groups based on their preference.

At step 804, control circuitry (e.g., control circuitry 504) retrieves versions of the social media post of the received first social media post of step 802. In some embodiments, the social media post many formats. For example, the format may include text, an image, a video, a story, any other suitable post, or any combination thereof.

At step 806, control circuitry (e.g., control circuitry 504) selects a second version of the plurality of versions of the social media post. In some embodiments, a sender may specify the criteria for the second version. For example, the sender may prefer versions with videos only, or pictures only. In some embodiments, the system considers the quality of each of the versions and selects the second version based on the highest-quality.

Step 808 includes control circuitry (e.g., control circuitry 604) modifying the second version of the social media post for each of the target users based on preferred criteria. For each target user category, the control circuitry may determine a post format, a post template, a set of text, images, or video, any other suitable edits, or any combination thereof to apply to the post. For example, the social media post optimizer may modify the selected version to form one or more modified versions of the post tailored to the target users. In some embodiments, the social media post optimizer may generate one or more modified versions in parallel, in series, or a combination thereof. For example, a text plug-in may be configured to insert salutations, insert emojis, change fonts, change language, change the wording, or a combination thereof. In a further example, an image plug-in may be configured to change texts in images, change background colors, change attached images, or a combination thereof. In a further example, a video plug-in may be configured to insert customized texts (e.g., an overlay) to a video message, insert a video clip in a text message, or a combination thereof. One or more modified versions of the post may be stored in storage (e.g., storage 508) of a user device, any other suitable storage, or any combination thereof.

At step 812, control circuitry (e.g., control circuitry 604) determines whether the number of modifications to the version exceeds the modification threshold set by each user. For example, each user may have a preference as to how much the post should be modified. In cases where the post exceeds the modification threshold, the post is forwarded but will garner minimal interactions from the target user or target user group. In some embodiments, for each target user, the control circuitry (e.g., control circuitry 604) determines that the number of modifications exceeds the modifying threshold and proceeds to perform corrective actions so that the modifications fall below the modifying threshold and the post if transmitted.

At step 814, control circuitry (e.g., control circuitry 604) determines that the number of modifications falls below the modifying threshold. In some embodiments, the control circuitry may determine that a target user is in agreement with the modifications and may proceed to presentation of the modified version of the social media post. In another embodiment, control circuitry may determine that the number of modifications to the modified version of the post falls below the modifying threshold for this target user and, at step 816, proceed to transmit the one or more modified versions of the social media post to the target user.

At step 818, control circuitry (e.g., control circuitry 504) determines that the number of modifications exceeds the modifying threshold. In some embodiments, the control circuitry performs a comparison of the modified version and a first version identified from the plurality of versions to determine the number of modifications performed on the modified version. Each modification counts as one modification. The total number of modifications is summed up to arrive at the number of modifications. In some embodiments, the control circuitry may select a first version of the social media post, select the one or more modified versions of the social media post and compare the first version of the social media post to the one or more modified versions of the social media post to determine the number of modifications in each version. In some embodiments, the control circuitry updates the metadata of the one or more modified versions with the number of modifications based on the comparison.

In some embodiments, the control circuitry may extract one or more identifiers associated with a first version of the social media post and with the one or more modified versions of the social media post. The one or more identifiers may include a location identifier, an image identifier, a text identifier, and a video identifier. The control circuitry may compare the one or more identifiers associated with the first version against the one or more identifiers associated with the one or more modified versions of the social media post to identify the number of modifications and store the number of modifications of each version.

At step 820, control circuitry (e.g., control circuitry 504) revises the one or more modified versions of the social media post. In some embodiments, the control circuitry may revise the one or more modified versions to remove modifications from the one or more modified versions to generate semi-modified versions of the social media post. For example, a number of modifications to the post can be removed to decrease the number of modifications in the modified version. The new version is semi-modified. In another embodiment, the control circuitry may delete the one or more modified versions that exceed the modification threshold and select a third version of the plurality of versions of the social media post. In such an embodiment, adjusting the preferred criteria associated with each target user or target user group by reducing modifications to form adjusted preferred criteria. Further, the control circuitry may modify the third version based on the adjusted preferred criteria of each target user or target user group to generate one or more semi-modified versions of the social media post for each target user or target user group. Control circuitry may, at step 822, forward the revised version of the social media post to the target user.

In some embodiments, while revising the modified version of the post, the control circuitry may identify one or more unique modifications to the one or more modified versions based on the comparing of the number of modifications. Accordingly, the control circuitry may modify the one or more modified versions by eliminating one or more unique modifications to generate one or more semi-modified versions. For example, the semi-modified version of the post will have fewer modifications.

It will be apparent to those of ordinary skill in the art that methods involved in the present disclosure may be embodied in a computer program product that includes computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. It should also be noted, the systems and/or methods described above may be applied to, or used in accordance with, other systems and/or methods.

What is claimed is:

1. A method for dynamically modifying a social media post, the method comprising:
    receiving, at a control circuitry, a first version of the social media post for presentation and a listing of target users or target user groups to potentially consume content of the social media post, wherein the first version comprises an image and metadata that identifies a content type, a content quality, an original time stamp, and an authorship;
    retrieving, by the control circuitry, a plurality of versions of the social media post, each version of the plurality of versions comprises metadata that identifies a content type, a content quality, an original time stamp, and an authorship, wherein the plurality of versions corresponds to the first version;
    identifying, by the control circuitry, based on the metadata, a higher quality (HQ) version of the social media post from the plurality of versions of the social media post comprising a HQ version of the image, wherein the HQ version of the image comprises an image with an improved vantage point;
    retrieving, using the control circuitry, corresponding preferred criteria for each target user or target user group from the listing of target users or target user groups;
    generating, using the control circuitry, a plurality of modified HQ versions of the social media post corresponding to each target user or target user group from the listing of target users or target user groups to potentially consume content, wherein each of the modified HQ versions of the social media post comprises a modification of the HQ version of the social media post based on the corresponding preferred criteria for the respective target user or target user group;
    determining a subset of the plurality of modified HQ versions of the social media post, wherein a number of modifications for each of the subset of the plurality of modified HQ versions of the social media post does not exceed a modifying threshold; and
    transmitting, for presentation by the control circuitry, each of the subset of the plurality of modified HQ versions of the social media post.

2. The method of claim 1, wherein the retrieving the plurality of versions of the social media post comprises:
extracting one or more identifiers associated with the social media post, wherein the one or more identifiers comprise one of a location identifier, image identifier, a text identifier, and a video identifier;
identifying the plurality of versions of the social media post from a database that stores social media posts based on the one or more identifiers associated with the social media post; and
storing the plurality of versions of the social media post.

3. The method of claim 1, wherein the identifying the HQ version of the social media post comprises:
assigning a viability index value to each version of the plurality of versions of the social media post, based on the metadata, that identifies the content type, the content quality, the original time stamp, and the authorship;
determining, based on the viability index value, the HQ version of the social media post with a highest viability index value; and
storing the HQ version of the social media post with the highest viability index value.

4. The method of claim 3, wherein the assigning the viability index value is based on at least one of an earliest publication, the content quality, and a number of modifications.

5. The method of claim 1, wherein the generating the plurality of modified HQ versions of the social media post comprises modifying at least one of a salutation, a closing, an emoji, a displayed object, or a video based on the preferred criteria for each target user or target user group to potentially consume content of the social media post.

6. The method of claim 1, wherein the retrieving the preferred criteria for each target user or target user group comprises:
accessing historical communications records stored in a database;
identifying one or more recently shared social media posts with the target user or target user groups; and
extracting the preferred criteria based on a salutation, a closing, an emoji, an image, a displayed object, or a video from the one or more recently shared social media posts.

7. The method of claim 6, wherein the extracting the preferred criteria comprises determining a pattern in the one or more recently shared social media posts based on the salutation, the closing, the emoji, the displayed object, or the video.

8. The method of claim 1, wherein the retrieving the preferred criteria for each target user or target user group comprises:
accessing historical communications records stored in a database for each of the target user or target user group, and wherein the historical communications records comprise one of a relationship record, a personal trait record, a stored group chat record, a subject matters sensitivity record, a stored social media post record, a stored electronic correspondence record, a stored comments record corresponding to the social media post, and a stored social media story record.

9. The method of claim 8, further comprising:
determining a mood for each target user or target user group;
extracting one or more patterns based on a mood identifier from the historical communications records for each target user or target user group;
generating, based on the one or more patterns, the preferred criteria; and
storing, in the database, the preferred criteria associated with each target user or target user group.

10. A system for dynamically modifying a social media post, the system comprising:
control circuitry configured to:
receive a first version of the social media post for presentation and a listing of target users or target user groups to potentially consume content of the social media post, wherein the first version comprises an image and metadata that identifies a content type, a content quality, an original time stamp, and an authorship;
retrieve a plurality of versions of the social media post, each version of the plurality of versions comprises metadata that identifies a content type, a content quality, an original time stamp, and an authorship, wherein the plurality of versions corresponds the first version;
identify, based on the metadata, a higher quality (HQ) version of the social media post from the plurality of versions of the social media post comprising a HQ version of the image, wherein the HQ version of the image comprises an image with an improved vantage point;
retrieve corresponding preferred criteria for each target user or target user group from the listing of target users or target user groups;
generate a plurality of modified HQ versions of the social media post corresponding to each target user or target user group from the listing of target users or target user groups to potentially consume content, wherein each of the plurality of modified HQ versions of the social media post comprises a modification of the HQ version of the social media post based on preferred criteria for the respective target user or target user group;
determine a subset of the plurality of modified HQ versions of the social media post, wherein a number of modifications for each of the subset of the plurality of modified HQ versions of the social media post does not exceed a modifying threshold; and
transmit each of the subset of the plurality of modified HQ versions of the social media post.

11. The system of claim 10, wherein the control circuitry is configured to retrieve the plurality of versions of the social media post by:
extracting one or more identifiers associated with the social media post, wherein the one or more identifiers comprise one of a location identifier, an image identifier, a text identifier, and/or a video identifier;
identifying the plurality of versions of the social media post from a database that stores social media posts based on the one or more identifiers associated with the social media post; and
store the plurality of versions of the social media post.

12. The system of claim 10, wherein the control circuitry is configured to identify the HQ version of the social media post by:
assigning a viability index value to each version of the plurality of versions of the social media post, based on the metadata, that identifies the content type, the content quality, the original time stamp, and the authorship;
determining, based on the viability index value, the HQ version of the social media post with a highest viability index value; and
store the HQ version of the social media post with the highest viability index value.

13. The system of claim 12, wherein the control circuitry is configured to assign the viability index value is based on at least one of an earliest publication, the content quality, and a number of modifications.

14. The system of claim 10, wherein the control circuitry is configured to generate the plurality of modified HQ versions of the social media post by modifying at least one of a salutation, a closing, an emoji, a displayed object, or a video based on the preferred criteria for each target user or target user group to potentially consume content of the social media post.

15. The system of claim 10, wherein the control circuitry is configured to retrieve the preferred criteria for each target user or target user group by:
   accessing historical communications records stored in a database;
   identifying one or more recently shared social media posts with the target user or target user groups; and
   extracting the preferred criteria based on a salutation, a closing, an emoji, an image, a displayed object, or a video in the one or more recently shared social media posts.

16. The system of claim 15, wherein the control circuitry is configured to extract the preferred criteria by determining a pattern in the one or more recently shared social media post based on the salutation, the closing, the emoji, the displayed object or the video.

17. The system of claim 10, wherein the control circuitry is configured to retrieve the preferred criteria for each target user or target user group by:
   accessing historical communications records stored in a database for each of the target user or target user group, and wherein the historical communications records comprise one of a relationship record, a personal trait record, a stored group chat record, a subject matters sensitivity record, a stored social media post record, a stored electronic correspondence record, a stored comments record corresponding to the social media post, and a stored social media story record.

18. The system of claim 17, the control circuitry is further configured to:
   determine a mood for each target user or target user group;
   extract one or more patterns based on a mood identifier from the historical communications records for each target user or target user group;
   generate, based on the one or more patterns, the preferred criteria; and
   store, in the database, the preferred criteria associated with each target user or target user group.

19. The method of claim 1, wherein the HQ version of the image further comprises a high pixel quality image.

* * * * *